UNITED STATES PATENT OFFICE.

HARMON N. MORSE, OF BALTIMORE, MARYLAND.

METHOD OF TREATING SILICATES.

1,286,718.   Specification of Letters Patent.   Patented Dec. 3, 1918.

No Drawing.   Application filed April 6, 1918.   Serial No. 227,033.

*To all whom it may concern:*

Be it known that I, HARMON N. MORSE, a citizen of the United States, residing at Baltimore, State of Maryland, have invented certain new and useful Improvements in Methods of Treating Silicates, of which the following is a specification.

My invention relates to a process of treating silicates for the purpose of extracting their basic constituents, potash ($K_2O$) and alumina ($Al_2O_3$); and of separating these from the acid constitutent silica ($SiO_2$): and it consists in the steps hereinafter described and claimed.

An object of my invention is to provide a process by means of which a separation and recovery of the important constituents of certain silicates may be effected without the employment of any manufactured acid.

A further object of my invention is to provide a process by means of which a relatively inexpensive reagent may be employed to recover the alumina and the silica, the reagent itself being recovered to be reemployed in a subsequent operation.

A further object of my invention is to provide a process by means of which the alumina may be recovered in basic form and, therefore, in a condition suitable for conversion into any of its derivatives.

A further object of my invention is to provide a process for treating silicates which obviates the necessity of the costly apparatus that is usually necessary when similar separations are effected by means of manufactured acids.

Other objects and advantages will appear in the following specification, and the novel features of the invention will be particularly pointed out in the appended claims.

The present invention relates primarily to the treatment of silicate minerals like orthoclase, microcline, mica, leucite, and sericite, which have been modified by the withdrawal of a portion of their silica by the means described in United States Patent No. 1,196,734, but is applicable to these and any other mineral silicates which by other means have been so modified in their composition or condition as to render them amenable to the treatment hereinafter described.

In the prior patent above mentioned, a process is disclosed which accomplishes quickly a transformation of a silicate mineral such as feldspar, under the influence of a mild treatment with caustic alkali, said transformation being similar to some of the reactions which in nature proceed with almost infinite slowness under the influence of water. The result of such treatment is the withdrawal of approximately one-third of the silica. New silicates are formed which contain the basic constituents, *i. e.*, potash and alumina, and approximately two-thirds of the silica of the feldspar. The new minerals are insoluble in water but are readily and completely decomposed by all the ordinary acids. In said prior patent a process is disclosed in which ground feldspar is treated with a caustic alkali, as for instance KOH, caustic potash, the mixture being dampened slightly to secure an intimate and uniform mixture, which is then dried out rapidly and eventually is heated for about two hours at a temperature approximately 300° C. The digested mass is treated with water and the soluble portion is separated from the insoluble by filtration. The soluble portion contains alkali silicate, while the insoluble portion is essentially a silicate of potassium and aluminium containing only about two-thirds as much silica as the original feldspar.

The present invention, as stated above, is designed to complete the treatment of this insoluble portion. The material is heated in a current of sulfur dioxid gas to any temperature at which the gas will combine with the potash, but will not combine with the alumina. A suitable temperature for this operation is 250° C. The potassium is thus converted into sulfite of potassium, and under certain conditions, to some extent into sulfate of potassium. These compounds are readily soluble in water and can be easily separated from the insoluble residue by solution and filtration. The sulfite of potassium thus obtained is converted into the sulfate on exposure to the air.

The residue, after removal of the potash constituent in the manner described, consists essentially of a silicate of aluminum which may be more or less hydrated. It is suspended in cold water and treated with sulfur dioxid gas. If the temperature of the water does not rise above the ordinary temperatures of the air, the alumina constituent of the silicate is dissolved, while the silica remains undissolved.

The solution containing the alumina is separated from the undissolved silica by filtration or other means, and is then boiled. On boiling, the sulfur dioxid is expelled in vapor form, and is employed for another extraction of alumina, or for the extraction of potash as previously described, while the alumina more or less hydrated is precipitated in an insoluble form.

While I have disclosed a process for the treatment of mineral silicates which have already had a portion of the silica removed, the invention in its broader aspect involves the treatment of minerals such as those mentioned above, by a process which renders the recovery of the constituents potash, silica and alumina very economical and obviates the use of expensive apparatus. These minerals in their natural state, as is well known, hold their basic constituents in insoluble form, and many attempts have been made to recover the potash, etc., on a commercial scale. Such recovery has usually involved the use of high temperatures, expensive apparatus, and, in many instances, costly reagents such as acids. In the present process, however, the use of sulfur dioxid renders the process comparatively simple and the fact that the gas is recovered, reduces the cost of the process to a minimum.

I claim:

1. The herein described steps in a process of treating silicates which are attacked by sulfur dioxid and which contain potash and alumina, which consist in heating the silicate in a current of sulfur dioxid gas to a temperature at which the gas attacks the potash but not the alumina.

2. The herein described steps in a process of treating silicates which are attacked by sulfur dioxid and which contain potash and alumina, which consist in heating the silicate in a current of sulfur dioxid gas to a temperature at which the gas converts the potash into soluble form, but does not attack the alumina, dissolving the potash compound in water and separating it from the insoluble residue.

3. The herein described steps in a process of treating silicates which are attacked by sulfur dioxid and which contain potash and alumina, which consist in heating the silicate in a current of sulfur dioxid gas to a temperature at which the gas converts the potash into soluble form, but does not attack the alumina, dissolving the potash compound in water, separating it from the insoluble residue, suspending said residue in water at ordinary temperature, and treating the suspended residue with sulfur dioxid gas to dissolve the alumina.

4. The herein described steps in a process of treating silicates which are attacked by sulfur dioxid and which contain as basic constituents potash and alumina, which consist in heating the silicate in a current of sulfur dioxid gas to a temperature at which the gas converts the potash into soluble form, but does not attack the alumina, dissolving the potassium compound in water, separating it from the insoluble residue, suspending said residue in water at ordinary temperature, treating the suspended residue with sulfur dioxid gas to dissolve the alumina, separating the alumina from the undissolved silica, and subsequently expelling the sulfur dioxid and precipitating the alumina in insoluble form.

5. The herein described steps in a process of treating silicates which are attacked by sulfur dioxid and which contain as basic constituents potash and alumina, which consist in heating the silicate in a current of sulfur dioxid gas to a temperature at which the gas converts the potash into soluble form, but does not attack the alumina, dissolving the potassium compound in water, separating it from the insoluble residue, suspending said residue in water at ordinary temperature, treating the suspended residue with sulfur dioxid gas to dissolve the alumina, separating the alumina from the undissolved silica, and expelling the sulfur dioxid.

6. The herein described steps in a process of treating silicates which are attacked by sulfur dioxid and which contain as basic constituents potash and alumina, which consist in heating the silicate in a current of sulfur dioxid gas to a temperature at which the gas converts the potash into soluble form, but does not attack the alumina, dissolving the potassium compound in water, separating it from the insoluble residue, suspending said residue in water at ordinary temperature, treating the suspended residue with sulfur dioxid gas to dissolve the alumina, separating the alumina from the undissolved silica, and precipitating the alumina in insoluble form.

7. The herein described steps in a process of treating silicates which are attacked by sulfur dioxid and which contain as basic constituents potash and alumina, which consist in heating the silicate in a current of sulfur dioxid gas to a temperature at which the gas converts the potash into soluble form, but does not attack the alumina, dissolving the potassium compound in water, separating it from the insoluble residue, suspending said residue in water at ordinary temperature, treating the suspended residue with sulfur dioxid gas to dissolve the alumina, separating the solution containing the alumina from the undissolved silica, and precipitating the alumina from its solution by means of heat.

8. The herein described steps in a process of treating silicates which are attacked by sulfur dioxid and which contain as basic constituents potash and alumina, which consist in heating the silicate in a current of sulfur dioxid gas to a temperature at which the gas converts the potash into soluble form, but does not attack the alumina, dissolving the potassium compound in water, separating it from the insoluble residue, suspending said residue in water at ordinary temperature, treating the suspended residue with sulfur dioxid gas to dissolve the alumina, separating the solution containing the alumina from the undissolved silica, and precipitating the alumina from its solution by boiling said last named solution.

9. The herein described process of treating mineral silicates containing as basic constituents potash and alumina in insoluble form, which consists in crushing the mineral, heating the crushed mineral with a caustic alkali to convert a portion of the silica to a soluble form, separating the soluble portion from the residue, heating the residue in a current of sulfur dioxid gas to a temperature at which the gas converts the potash into a soluble form but does not attack the alumina, separating out the potassium compound, treating the potash free residue with sulfur dioxid gas to dissolve the alumina, and separating the alumina from the silica.

In testimony whereof I affix my signature.

HARMON N. MORSE.